July 9, 1957  D. M. MONTGUIRE  2,798,740
CONNECTION FACILITATING AND ADJUSTABLE DRAFT DEVICE
Filed May 5, 1954  2 Sheets-Sheet 1

INVENTOR.
DAVID M. MONTGUIRE
BY *Andrus & Sceales*

Attorneys

July 9, 1957 — D. M. MONTGUIRE — 2,798,740
CONNECTION FACILITATING AND ADJUSTABLE DRAFT DEVICE
Filed May 5, 1954 — 2 Sheets-Sheet 2
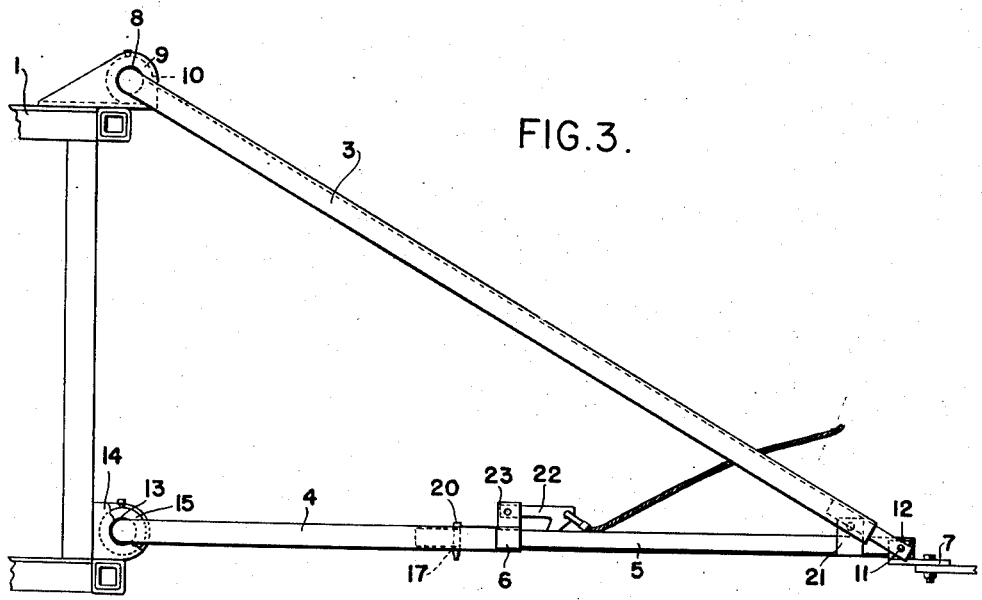
FIG. 3.
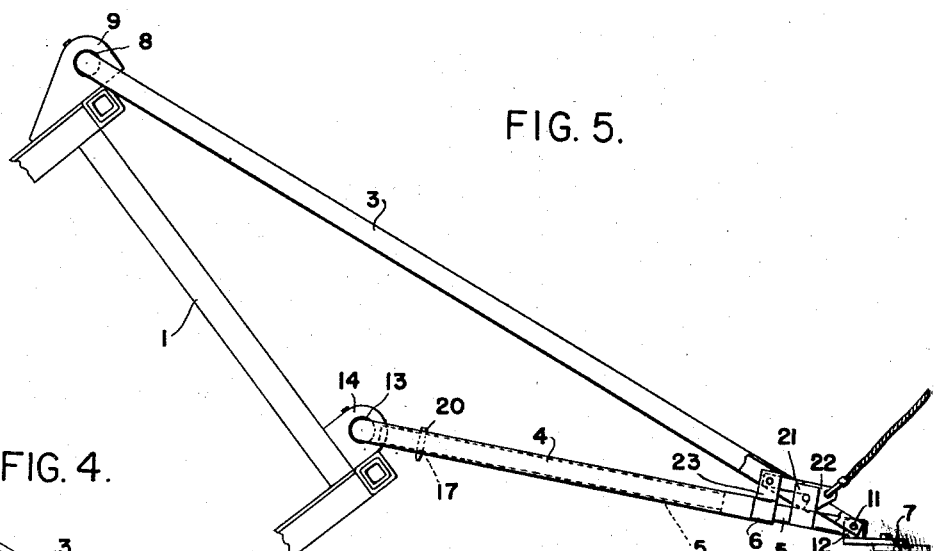
FIG. 5.
FIG. 4.
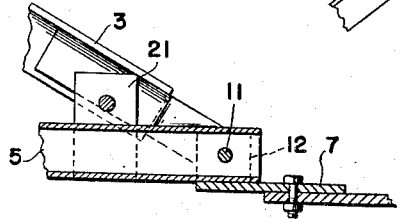
INVENTOR.
DAVID M. MONTGUIRE
BY Andrus & Seealer
Attorneys

United States Patent Office 2,798,740
Patented July 9, 1957

2,798,740

CONNECTION FACILITATING AND ADJUSTABLE DRAFT DEVICE

David M. Montguire, Vancouver, British Columbia, Canada

Application May 5, 1954, Serial No. 427,786

1 Claim. (Cl. 280—477)

This invention relates to a hitch and particularly relates to a hitch for drawing an implement or the like whereby the implement may be drawn with the forward end at various adjusted positions of tilt.

In general, the invention is directed to a hitch comprising an upper pair of arms pivoted at one end in spaced relation to the upper portion of the forward end of the implement or other driven member to be drawn and extending downwardly from the implement and toward each other to a common hitch plate to which the forward end of the arms are pivoted. A lower pair of arms are pivoted at one end in spaced relation to the lower portion of the forward end of the implement to be drawn and extend forwardly and toward each other to a common sliding indexing member to which the lower arms are secured. The indexing member slides on a longitudinally extending bar to the forward end of which is secured the hitch plate previously referred to and which is bolted or otherwise secured to the tractor or other driving means.

The bar receiving the indexing member is provided with vertical holes as is the indexing member. Under one use of the invention a pin is inserted through matching holes in the bar and indexing member to pull the implement forwardly, the location of the indexing member on the bar determining the tilted or pivotal position of the forward end of the implement being pulled or driven.

Under another use of the invention the forward end of the bar is provided with a clevis member and the indexing member carries a latch. When the bar moves rearwardly through the indexing member, upon backing of the tractor, the latch engages the clevis and the driven member can then be pulled forwardly with the forward end of the driven member tilted upwardly. The latch can be released from the clevis by pulling on a cord or a cable secured to the forward end of the latch. When the latch is released, upon forward pull of the tractor or driving member the bar will move forwardly through the indexing member until the indexing member engages a pin located in one of the vertical holes in the bar. The driven implement can then be pulled forwardly with the forward end of the implement pivoted downwardly to the position at which it is desired to draw the driven implement.

The hitch of the invention thus provides a hitch which can be utilized to draw an implement or the like with the forward end thereof disposed at various adjusted pivotal working or non-working positions.

Other objects and advantages of the invention will appear hereinafter in connection with the following description of an embodiment of the invention as illustrated in the accompanying drawings.

Fig. 3 is a side elevational detail view showing the downward location of the forward end of the transplanter with the hitch in the position as illustrated in Fig. 2;

Fig. 4 is a section taken on line 4—4 of Figure 2; and

Fig. 5 is a side elevational detail view of the hitch with the transplanter tilted upwardly for turning around in the field.

Figure 1:
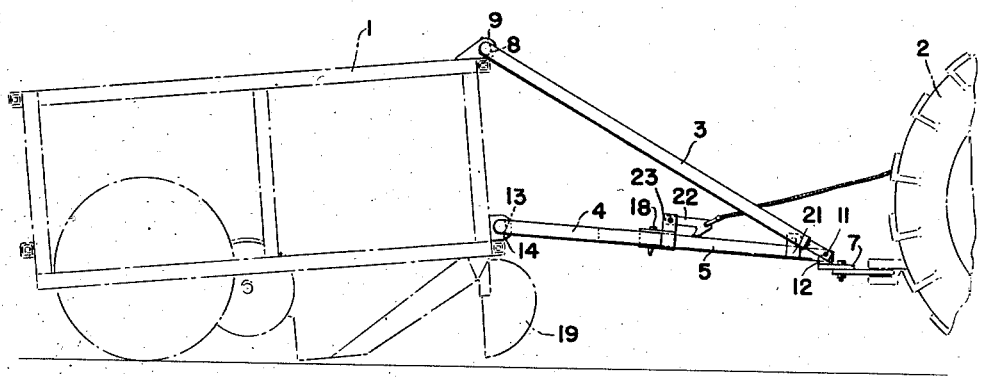
Figure 1 is a longitudinal side elevational view showing the hitch attached to a tractor and a transplanting machine with a pin through the index member and slide bar and the forward end of the machine tilted upwardly from the ground for pulling on the highway.
Figure 2:
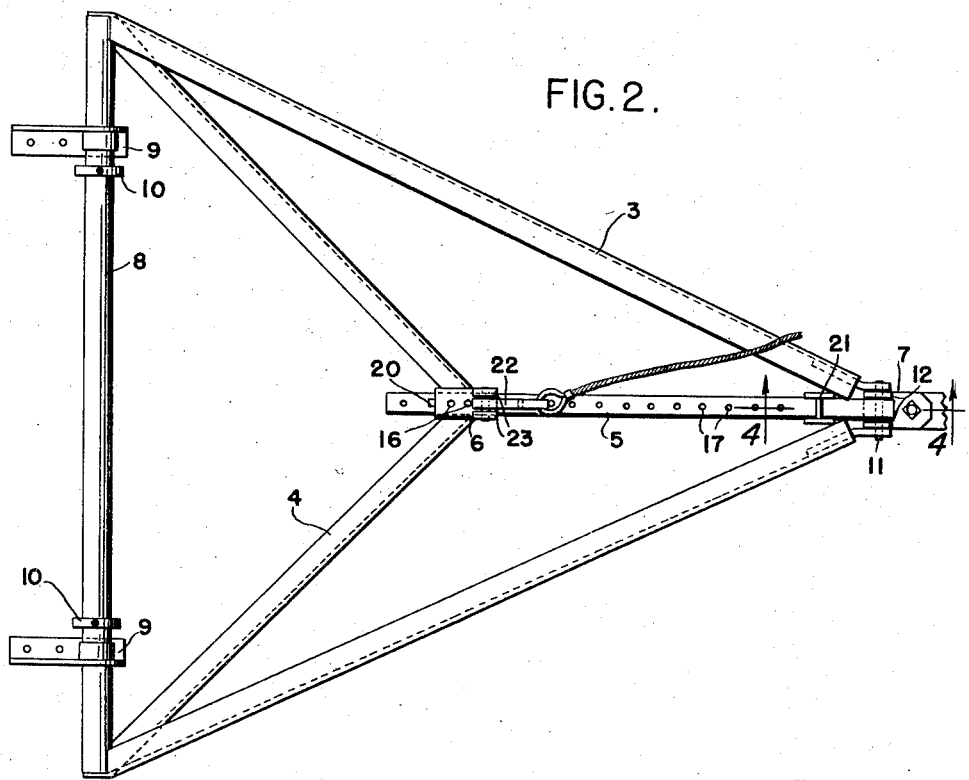
Fig. 2 is a top plan view of the hitch and particularly illustrating the upper part of the hitch and showing the lower part of the hitch with the index member engaged with a pin inserted through the rear portion of the bar to tilt the transplanter downwardly at the forward end.

Referring to the drawings there is shown a hitch illustrated as secured at one end to the forward end of a two-wheeled transplanter 1 and at the other end to a tractor 2.

The hitch of the invention comprises in general a pair of upper arms 3, a pair of lower arms 4, a hollow slide bar or longitudinal extending member 5, an indexing sleeve 6 disposed over bar 5, and a hitching plate 7.

The upper arms 3 in the embodiment shown are secured at their inner end as by welding to a tube 8 which extends transversely of the forward end of the driven implement, in this case the transplanter 1. The tube 8 projects through a pair of brackets 9 and is held against transverse movement in the brackets by the set collars 10. The tube 8, however, is free to rotate in the brackets. The brackets 9 are suitably secured to the forward upper end of the transplanter 1 at transversely spaced positions.

The arms 3 are preferably of angular cross-section to make them light in weight, and the arms converge toward each other in their downward extent from the transplanter. The forward end of the arms are pivoted by pin 11 to the upstanding ears 12 provided on each side of the rear of the hitching plate 7. Pin 11 also pivots ears 12 of plate 7 to the forward end of bar 5. The hitching plate is generally flat and has a vertical hole for bolting or otherwise securing the plate to the tractor 2.

The lower arms 4 of the hitch are considerably shorter than the upper arms but are also of angular cross-section. The inner ends of arms 4 are secured as by welding to a tube 13 which extends transversely of transplanter 1 through brackets 14 suitably secured to the forward lower portion of transplanter 1. Set collars 15 prevent transverse movement of tube 13 in bracket 14 but tube 13 is free to rotate in the brackets.

As in the case of the upper arms 3, the lower arms 4 converge rearwardly of hitching plate 7 and are welded to the indexing sleeve 6 which receives the hollow slide bar 5. Indexing sleeve 6 has a plurality of longitudinally spaced vertical apertures 16 and slide bar 5 is provided with similar apertures 17 along its length.

In Figure 1 the pin 18 is shown as located in aligned apertures 16 and 17 of indexing sleeve 6 and bar 5 respectively. The location of indexing sleeve 6 in bar 5 determines the pivotal position of the forward end of the implement being drawn. The transplanter 1 shown in the drawings for purposes of illustration, has a pair of coulters 19 for breaking the ground. In the position of the hitch parts illustrated in Figure 1, the coulters 19 are clear of the ground and the forward end of the transplanter is tilted upwardly. Thus, in this position the transplanter may be drawn over the highway.

In the use of the invention illustrated in the other figures of the drawings, the hitch is initially set in operating position to lower the forward end of transplanter 1 and lodge the coulters 19 in the ground and then is automatically operated to pivot the forward end of the transplanter upwardly for turning it around in a field.

To initially set the hitch parts for lowering the forward end of transplanter 1, tractor 2 is driven forwardly to pull bar 5 through indexing member 6. This locates indexing member 6 on the rear portion of bar 5. When the desired position is obtained, a pin 20 is placed in aperture 17 of bar 5. As long as tractor 2 is driven forwardly, indexing member 6 will remain in engagement with pin 20.

When it is desired to tilt the forward end of the transplanter 1 upwardly to turn it around at the end of a field, for example, tractor 2 is backed to slide bar 5 rearwardly through indexing member 6. The implement wheels are braked or blocked when the tractor is backed.

Near the forward end of bar 5, the clevis 21 is secured to bar 5. In turn a latch 22 is pivoted to the upright 23 on the forawrd end of the indexing member 6. The forward end of the latch 22 is tapered and the latch is transversely slotted. As bar 5 moves rearwardly through indexing member 6 when clevis 21 is reached, latch 22 due to the taper, rides over the clevis and latches with clevis 21. The tractor can then be driven forwardly. The transplanter will then be drawn with the forward end tilted upwardly and the coulters 19 spaced from the ground. This position of the hitch is shown in Fig. 5.

A cable 24 is secured to latch 22 and extends to tractor 2. When the operator desires to drop the forward end of the transplanter 1, cable 24 is pulled to disengage latch 22 from clevis 21. Bar 5 then moves forwardly through indexing member 6 as the tractor is driven forwardly until the indexing member 6 engages pin 20 which has remained in the aperture 17 in which it was originally placed.

The hitch of the invention is simple in construction and operates to permit pulling or backing of transplanter or other vehicle or agricultural implement at various tilted positions. The hitch can be locked and used as a straight draw bar with any tractors which have hydraulic mechanism for raising and lowering the implement. It also can be used where the hitch is employed to automatically raise and lower the implement.

Various modes of carrying out the invention may be employed within the scope of the accompanying claim which particularly points out and distinctly sets forth the subject matter regarded as the invention.

I claim:

A draw hitch for an implement requiring selective tilt adjustment between two positions during operation and fixed tilt position during road travel, employing a pair of arms pivotally connected to each other at their forward ends on a transverse horizontal axis and separately pivotally connected at their rear ends to the implement at substantially vertically spaced corresponding transverse horizontal axes, a forwardly extending draw hitch at the forward end of one of said arms, the upper arm being rigid in length, and the lower arm being collapsible in length to provide the required tilt adjustment for the implement and comprising a pair of members constituting opposite ends of the arm and connected together at their inner ends to provide for longitudinal relative sliding movement therebetween for selectively collapsing and extending the arm, means to fix said members against relative sliding movement to provide a fixed tilt position for the implement during road travel, and means operable only when said last named means is released to provide for tilting of the implement under the selection of the operator and including abutment means carried by said members for limitng the extension of said lower arm during forward draw, a latch carried by one of said members, and latch means carried by the other of said members, said latch being automatically engageable with the latch means when said members are moved to a substantially collapsed position of said lower arm to secure the members against extension, said latch being releasable by said operator to free said members for extension during draw of the implement.

References Cited in the file of this patent

UNITED STATES PATENTS

| | | |
|---|---|---|
| 1,783,189 | Greun | Dec. 2, 1930 |
| 2,328,343 | Jacob | Aug. 31, 1943 |
| 2,415,479 | Forney | Feb. 11, 1947 |

FOREIGN PATENTS

| | | |
|---|---|---|
| 496,757 | Belgium | Nov. 3, 1950 |
| 964,160 | France | Aug. 7, 1950 |
| 1,007,149 | France | May 2, 1952 |
| 805,964 | Germany | June 11, 1951 |